United States Patent [19]

Schilling et al.

[11] Patent Number: 5,336,438

[45] Date of Patent: Aug. 9, 1994

[54] RAPID AND MEDIUM SETTING HIGH FLOAT BITUMINOUS EMULSIONS FROM DIFFICULT ASPHALTS

[75] Inventors: Peter Schilling; Hans G. Schreuders, both of Charleston, S.C.

[73] Assignee: Westvaco Corporation, New York, N.Y.

[21] Appl. No.: 725,422

[22] Filed: Jul. 3, 1991

Related U.S. Application Data

[63] Continuation-in-part of Ser. No. 354,123, May 22, 1989, abandoned.

[51] Int. Cl.$^5$ .................... B01J 13/00; C08L 95/00
[52] U.S. Cl. .................... 252/311.5; 252/356; 106/277; 106/284.4
[58] Field of Search .................... 252/311.5, 356, 357; 106/277, 284.4

[56] References Cited

U.S. PATENT DOCUMENTS

| | | | |
|---|---|---|---|
| 2,392,863 | 1/1946 | Rudd | 106/123 |
| 2,679,462 | 5/1954 | Monson | 106/123 |
| 2,855,319 | 10/1959 | McConnaughay | 106/123 |
| 3,412,056 | 11/1968 | Crawford et al. | 260/22 |
| 3,451,958 | 6/1969 | Riedeman et al. | 260/23 |
| 3,753,968 | 8/1973 | Ward | 260/97.6 |
| 3,763,053 | 10/1973 | Bills | 252/357 X |
| 3,899,476 | 8/1975 | Ward | 260/97.5 |
| 3,928,061 | 12/1975 | Hellsten et al. | 252/311.5 X |
| 4,081,462 | 3/1978 | Powers et al. | 260/501.1 |
| 4,433,084 | 2/1984 | Ostermeyer et al. | 524/62 |
| 4,629,511 | 12/1986 | Vanderzanden | 106/277 |
| 4,676,927 | 6/1987 | Schilling et al. | 252/311.5 |
| 4,806,166 | 2/1989 | Schilling et al. | 106/284.06 |
| 4,859,245 | 8/1989 | Schilling et al. | 106/277 |

FOREIGN PATENT DOCUMENTS 1032363  6/1966  United Kingdom .

OTHER PUBLICATIONS

"Appendix B—Testing Emulsified Asphalt", *A Basic Asphalt Emulsion Manual*, Asphalt Emulsion Manufactuers Association, Feb. 1979, pp. 189–191.

*Primary Examiner*—Robert L. Stoll
*Assistant Examiner*—Daniel S. Metzmaier
*Attorney, Agent, or Firm*—Daniel B. Reece, III; Terry B. McDaniel; Richard L. Schmalz

[57] ABSTRACT

High float asphalt emulsions with high demulsibilities are prepared from asphalts ill-suited for prior art emulsifiers by mixing a combination of fatty acid and the reaction products of fatty acid with acrylic acid, methacrylic acid, fumaric acid, or maleic anhydride in the form of their alkali salts in the soap solution, and adding to the heated asphalt, prior to the emulsification step, reaction products of fatty acids with mono-, di-, and triethanol amine.

7 Claims, No Drawings

RAPID AND MEDIUM SETTING HIGH FLOAT BITUMINOUS EMULSIONS FROM DIFFICULT ASPHALTS

This application is a continuation-in-part of our commonly assigned, co-pending U.S. patent application Ser. No. 07/354,123 filed May 22, 1989, now abandoned, entitled "Rapid and Medium Setting High Float Bituminous Emulsions".

BACKGROUND OF THE INVENTION

1. Field of the Invention

This invention relates to paving compositions comprising a mixture of aggregate and bituminous emulsions. In particular, the present invention relates to the preparation of rapid set high float emulsions or high float emulsions with higher demulsibilities than obtained with common "high float" emulsifiers such as crude tall oil. High float medium set emulsions can be obtained as well. More particularly, this novel process is capable of producing these emulsions utilizing "difficult" asphalts.

2. Description of the Prior Art

Generally, there are two ways to produce such a mixture which, after application onto a worn out road surface, results in a strong matrix suitable to bear heavy traffic. One way to produce an aggregate asphalt emulsion mix is to apply emulsion onto the road surface to be repaired and spread aggregate on top. The stones, which make up the aggregate, sink into the emulsion; and upon setting of the emulsion, which is the result of evaporation of the water from the emulsion, the stones are locked into place; and a strong matrix is obtained. Emulsions used for this type of application are generally referred to as rapid setting emulsions. The American Society for Testing and Materials (ASTM) has promulgated certain testing methods and standards for asphalts and asphalt emulsions. Here, the main specification for anionic rapid setting emulsions according to ASTM-D977 is a minimum demulsibility of 60% when treated with a 0.02N $CaCl_2$ solution.

The second method to achieve an aggregate-emulsion mix is by mixing the required amount of aggregate and asphalt emulsion at a separate location in a central mixing plant. These mixes are transported to the locations where they are applied. One important feature of the asphalt emulsions to be suitable for this technique is the ability to produce a mix which still can be handled after transport to the location of application. The most expeditious way to do this is to use cutback asphalt from the emulsion. Cutback asphalt is generally referred to as a blend of fuel oil or other petroleum distillates and asphalt. The content of oil may be in the range of 1-15% based on asphalt. The advantage of using cutback asphalt for these mixes is the fact that even when the emulsion in the mix breaks prematurely, the viscosity of the asphalt is still low enough that the mix can be handled. Emulsions used for this type of application are referred to as medium setting emulsions. According to ASTM-D977, they are distinguished from rapid setting emulsions in that no minimum demulsibility is required.

Both cationic and anionic emulsions are applied in the field. The ionic character of the emulsion is distinguished by the type of emulsifier which is used for the preparation and especially by the pH value of the emulsion. Cationic emulsions are generally prepared at pH values between 1.5 and 7.0. Nitrogen containing chemicals, such as fatty amines, fatty diamines, and fatty amidoamines, fatty quaternary-ammonium salts or aminolignins, are used as cationic emulsifiers. Anionic emulsions are prepared at pH values ranging from 7 to 12. Fatty acids or fatty sulfonic acids, which upon treatment with alkali, such as sodium hydroxide or potassium hydroxide, form anionic soaps, are the most effective anionic emulsifiers.

One feature of bituminous pavements regarded as particularly objectionable is the tendency to soften in hot weather resulting in shoving, rutting or bleeding (migration of the binder to the surface) of the matrix. While hard asphalts are not softened at increased temperatures, they are hard to emulsify and show objectionable properties at low temperatures, such as premature cracking.

By employing a suitable emulsifier system for the preparation of the asphalt emulsion, soft asphalts can be modified in a way that after the emulsion has set, the asphalt will be modified so that the temperature range where it possesses decreased flow is extended. Low temperature susceptibility is also improved by maintaining its ductile properties in cold weather (less brittle at low temperature). In general terms, by this modification of the asphalt, the deformation of the road surface in hot weather is prevented, resulting in loss of aggregate from the surface. Emulsifiers, where the hardness at higher temperatures of the asphalt is increased and the hardness at lower temperatures it not adversely affected, are disclosed by K. E. McConnaughay in U.S. Pat. No. 2,855,319.

The most effective emulsifying agent is tall oil soap, obtained as the by-product of the kraft pulping process whereby chipped pinewood is digested with sodium hydroxide and sodium sulfide. If crude tall oil is employed to prepare the emulsion, generally 2% to 4% based on the weight of asphalt is sufficient to obtain high float emulsions.

The compositions of various asphalt emulsions are evaluated by a standard test designated ASTM-D244. An integral part of this residue by distillation test is the exposure of a representative sample of the emulsion to high temperatures (around 260° C.) for up to one hour. The resulting "emulsion residue" is utilized to measure both the increased melting point and the resistance to flow at elevated temperature via the "float test." In this test (ASTM-D139) a plug of "emulsion residue" is solidified in a brass collar held by an aluminum float which is placed into a water bath heated to 140° F. The time required for the water to break through the plug is determined. The asphalt emulsion residue forms the high float test when the collar floats for a least 1,200 seconds. The "residues" of the emulsion typically are considered to be what remains from an asphalt emulsion after the water is evaporated. The significance attached to the high float property is that the residue from a high float emulsion will not flow under the force of gravity at temperatures as high as 140° F. As a result of the high amounts of tall oil soap emulsifier, these high float emulsions show the characteristics of medium setting emulsions since the demulsibility with calciun chloride solution is less than 60% (in most cases less than 20%), which minimum value is specified for rapid setting emulsions (ASTM-D977).

"Rapid setting" emulsions are useful for seal coats, surface treatments, penetration treatment of macadam, etc. Preparation of rapid setting high float emulsions is disclosed by L. F. Ostermeyer et al., in U.S. Pat. No.

4,433,084. In one embodiment of the Ostermeyer et al., process, asphalt cement is mixed with tall oil or tall oil derivatives, such as tall oil pitch or black liquor soap skimmings, at levels of 1–5% based on the weight of the blend prior to emulsification. The blend is then emulsified by conventional techniques to provide a rapid setting emulsion. According to a second embodiment, tall oil pitch or derivatives (such as tall oil heads, tall oil fatty acid, or rosin) are reacted with strong base, such as sodium hydroxide or potassium hydroxide, to form a suitable modifier which is added to the asphalt cement prior to emulsification at a dosage of 0.4–10% based on the weight of the asphalt. In a third embodiment, an alkaline soap of tall oil pitch (or derivative) is formed and added to the asphalt cement prior to emulsification. Rapid setting high float emulsions are also known to be obtained by incorporating 1–5% of a styrene-butadiene-styrene block copolymer or styrene-isoprene-styrene-block copolymer into the asphalt cement prior to emulsification.

In U.S. Pat. No. 4,676,927 to Schilling et al., the use of blends of tall oil or tallow fatty acids and their reaction products with acrylic acid, fumaric acid or maleic anhydride has been disclosed. Vanderzanden in U.S. Pat. No. 4,629,511 discloses the use of combinations of anionic emulsifiers, such as fatty acid sodium salts and fatty acid esters, such as methyl oleate for the preparation of high float rapid set (HFRS) emulsions.

Evaluation of these types of emulsifiers with several asphalts manufactured from a variety of crude oil sources has shown that the prior art emulsifiers described above will not give HFRS emulsions meeting the set specification with certain types of asphalts. For example, U.S. Pat. No. 4,676,927 to Schilling et al., teaches the use of tall oil soaps as anionic emulsifiers to produce high float (HF) emulsions. However, increasing float times by increasing the fatty acid content of an emulsion also results in a corresponding decrease in demulsibility. Therefore, any HF emulsion thus created will show the physical characteristics of a medium setting emulsion (i.e., the demulsibility with the calcium chloride solution will be less than the 60% minimum specified by the ASTM for rapid setting emulsions).

The object of this invention is to provide a novel method to produce asphalt emulsions with all asphalts, including "difficult" asphalts, whereby the emulsions meet HFRS specifications and HFMS specifications. "Difficult" asphalts are those asphalts which are known to be very difficult to emulsify under normal conditions to meet high float rapid set specifications and are characterized primarily by high wax content and by high napthenic acid content, giving the asphalt an acid number of from 3 to 5. Such "difficult" asphalts include, but are not limited to, California Basin and Canadian Crude asphalts.

SUMMARY OF THE INVENTION

The above objective to produce high float asphalt emulsions with high demulsibility using asphalts ill-suited for prior art emulsifiers is met by mixing a combination of fatty acid and the reaction products of fatty acid with acrylic acid, methacrylic acid, fumaric acid or maleic anhydride in the form of their alkali salts in the soap solution, and adding to the heated asphalt prior to emulsification step reaction products of fatty acids with mono-, di-, and triethanol amine. The fatty acids may be derived from vegetable oil or tallow, or some combination thereof. The preferred vegetable oil is tall oil. The levels of the emulsifiers are typically from 0.3% to 0.5% (for high float rapid set emulsions) or from above 0.5% to 1.5% (for high float medium set emulsions) based on the weight of the total emulsions, and the levels of the asphalt additive are typically from 0.1% to 0.7%, based on the weight of the asphalt in the emulsion.

DESCRIPTION OF THE PREFERRED EMBODIMENTS

In preparing the bituminous emulsions of this invention, an aqueous soap solution of the emulsifiers described below is intimately mixed under high shear in a colloid mill. The bitumen content, to which the additives of this invention have been added prior to emulsification, can range from 30% to about 80% by weight, preferably between 60% and 70%. The dosage of the emulsifier normally ranges from 0.1%–10% by weight of the emulsion, to achieve the high float emulsion specifications with "difficult" asphalts, preferably between 0.3%–1.5% by weight of the emulsion. Dependent on the emulsifier, the emulsions are obtained in a pH range of greater than 7 to 12, with the optimum performance at a pH of about 10.5–11.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted with solvents (cutback asphalts). Practically any viscosity or penetration graded asphalt cement for use in pavement construction as described in ASTM designation D-3381 and D-946 may be emulsified with the aid of the emulsifiers of this invention. For the purpose of the present invention, "bitumen" and "asphalt" are used interchangeably.

Alkaline soaps are obtained by adding sodium hydroxide, potassium hydroxide or any other suitable base to the aqueous suspension of the emulsifier.

Thereafter, the soap solution, which is preheated to about 55° C., and the fluid asphalt, which is preheated to 120°–125° C., are mixed under high shear in a colloid mill for 30 seconds to give asphalt emulsions of brown color and creamy texture. Prior to testing according to ASTM-D-244, the emulsions are stored at 70° C. for 16 hours.

The emulsifiers for the emulsions of this invention perform very satisfactorily without auxiliary emulsifiers. However, occasionally it may be necessary to alter the performance of the emulsion to obtain improved viscosity at a given asphalt content or improved storage stability. Examples of such auxiliary emulsifiers are lignin isolated from sulfite or kraft pulping processes, sulfonic acid-containing surfactants such as alkylsulfonates, long chain alkylsulfonates and petroleum sulfonates, dimerized unsaturated fatty acids ($C_{36}$-dimer acids or $C_{54}$-trimer acids) known under the tradename EMPOL ® and VINSOL ®, a highly oxidized resinous extract from wood stumps. Nonionic emulsifiers, such as ethoxylated alkylphenols or fatty alcohols, may also be part of the emulsifier formulation.

The emulsions prepared with the emulsifiers disclosed in this invention are stable and can be stored for a long period of time until required for use.

The present invention resides in an improvement of the present state of the art high float emulsifier/asphalt additive systems which allows the emulsification of "difficult" asphalts to meet the specification of high float rapid set asphalt emulsions.

In an initial evaluation of various tall oil fatty acids and blends of tall oil fatty acids with $C_{22}$-tricarboxylic acid at emulsifier concentrations of 0.4–0.5% based on the total emulsion and pH values 12.0–12.5, it was found that a combination of fatty acids and $C_{22}$-tricarboxylic acid is necessary to obtain emulsions with high demulsibility and long float times of the asphalt residue. However, the specifications of a minimum demulsibility of 60% and a minimum float time of 1200 seconds at 140° F. for high float rapid set emulsions could not be achieved. Combination emulsifiers increased the float times with increasing mono fatty acid content and increased demulsibility with increasing $C_{22}$-tricarboxylic acid content.

Modification of the asphalt by adding 0.1–0.6% tall oil fatty acid-triethanol amine condensate prior to the emulsification step improved the emulsions. Independent of the type of tall oil fatty acid used, the float times of the asphalt residues improved and met the high float specifications. However, the polycarboxylic acid or anhydride component must be present in the emulsifier formulation to produce emulsions meeting both specifications, namely 60% demulsibility and 1200+ second float time.

As the examples of this invention will show, mono-, di- and triester of triethanol amine, as well as the mono- and diester of tall oil fatty diethanol amide are efficient additives for even "difficult" asphalt to achieve satisfactory emulsions.

Suitable precursor amino alcohols are not restricted to the ethanol amines described above but to the general class of amino alcohols, and include the following:

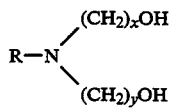

where $R=CH_3—$, $C_2H_5—$ through $C_{18}H_{30-36}—$, $HO(CH_2)_z—$ and where x, y, z=2–6 and

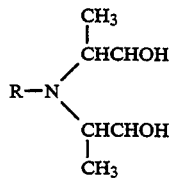

where $R=CH_3—$, $C_2H_5—$, through $C_{18}H_{30-36}—$,

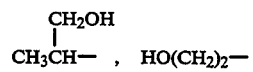

where z=2–6.

ASPHALT EMULSIFIERS

The chemical structure of the reaction products of fatty acids derived from crude tall oil, distilled tall oil, tallow, i.e., generally, $C_{10}$–$C_{18}$ unsaturated fatty acids, or rosin derived resin acids with acrylic acid, fumaric acid or maleic anhydride depends on the use of catalytical amounts of iodine for the reaction. The reaction products are mixtures of $C_{18}$-monocarboxylic and $C_{21}$-dicarboxylic acids and $C_{22}$-tricarboxylic acids or anhydrides. The reaction products of resin acids with the same reagents are mixtures of $C_{20}$-polycyclic monocarboxylic acids and $C_{24}$-polycyclic tricarboxylic acid or $C_{24}$-polycyclic polytricarboxylic anhydrides.

Diels-Alder addition of acrylic acid, methacrylic acid, fumaric acid, maleic acid or anhydride to polyunsaturated acids with conjugated double bonds yields, in the case of $C_{18}$ polyunsaturated fatty acid, the cyclohexene derivatives of formula I:

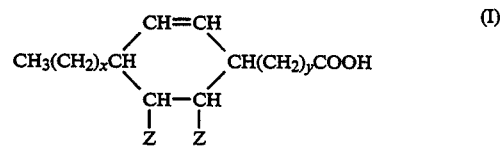

wherein x and y are integers from 3 to 9 and x and y together equal 12, at least one Z is a carboxylic acid group and any remaining Z is hydrogen. In the case of the anhydride, a five membered oxygen containing ring is attached to the cyclohexene structure (formula II):

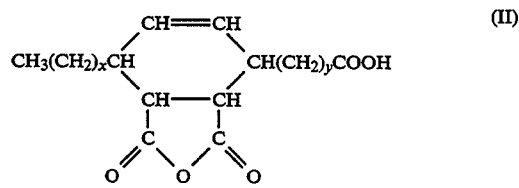

Acids and anhydrides of this type are disclosed in U.S. Pat. Nos. 3,753,968 and 3,899,476 to Ward, U.S. Pat. No. 4,081,462 to Powers et al., and British Patent 1,032,363 and U.S. Pat. No. 3,412,056, both to Crawford.

"Ene"-adducts of maleic anhydride and monounsaturated fatty acids, such as oleic acid, are isomeric succinic anhydride type tricarboxylic acids (III-A) and (III-B):

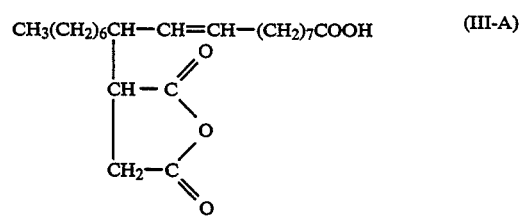

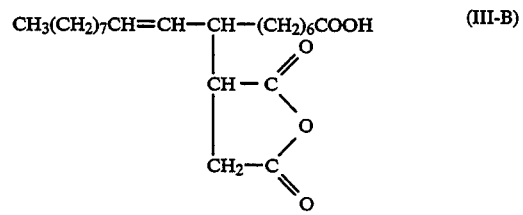

These adducts are disclosed in German Patent 973,398 to Stein et al. and in U.S. Pat. No. 3,451,958 to Riedman et al.

Examples of the $C_{24}$-polycyclic tricarboxylic acid and anhydride are the reaction products of levopimaric acid with fumaric acid, i.e., fumaropimaric acid anhydride (IV), and the product of levopimaric acid with maleic anhydride, i.e., maleopimaric acid anhydride (V), as described in Kirk-Othmer, *Encyclopedia of Chemical Technology*, 3rd Edition, Vol. 20, Wiley-Interscience Publication, John Wiley & Sons, New York, 1978:

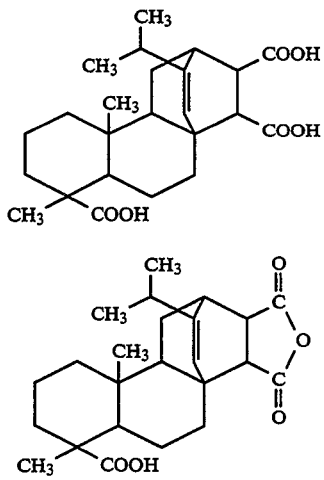

ASPHALT ADDITIVES

The chemical structure of the reaction products of tall oil fatty acids or oleic acid with amino alcohols, such as mono-, di-, triethanol amine is dependent on the ratio of fatty acid to amine. Oleic acid, which is a major component of tall oil fatty acid may serve as example fatty acid.

Commercial oleic acid and tall oil fatty acid have the following typical compositions:

| % | Oleic Acid | Tall Oil Fatty Acid |
|---|---|---|
| Palmitic Acid | 4.29 | 2.37–5.70 |
| Palmitoleic Acid | 11.00 | 1.03–1.80 |
| Oleic Acid | 72.00 | 43.12–47.13 |
| Elaidic Acid | 1 | 1–23.50 |
| Linoleic Acid | 4.11 | 3.20–33.11 |
| Conjugated Linoleic Acid | 1.4 | 5.30–9.10 |

The amino alcohols distinguish themselves by the difference in reactivity of amino groups and hydroxyl groups.

H$_2$NCH$_2$CH$_2$OH: monoethanol amine (VI)
HN(CH$_2$CH$_2$OH)$_2$: diethanol amine (VII)
N(CH$_2$CH$_2$OH)$_3$: triethanol amine (VIII).

Mono- and diethanol amine will give both amide- and ester-functionalities when fully reacted with fatty acid; whereas triethanol amine will only give esters. Because of the higher nucleophilicity of the amino groups, ethanol amide or diethanol amide (IX) will be the predominant reaction product of one mole oleic acid with one mole amino alcohol.

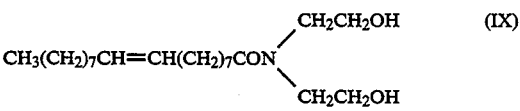

At a ratio of 2 moles or 3 moles of oleic acid to one mole diethanol amine, the mono- (X) and diester (XI) of (IX) will result:

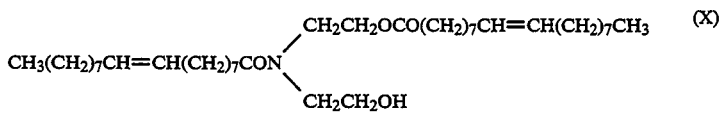

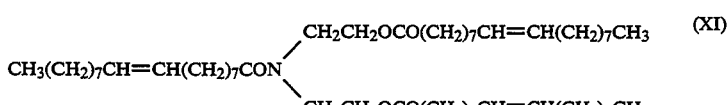

Triethanol amine (VIII) with three hydroxyl groups and a tertiary amino group, unable to form an amide bond, will give the mono- (XII), di- (XIII) and triester (XIV) when reacted with one, two and three moles of oleic acid.

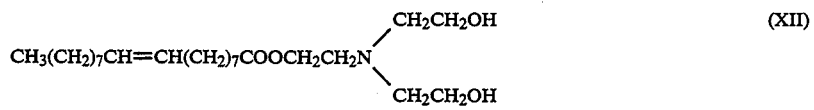

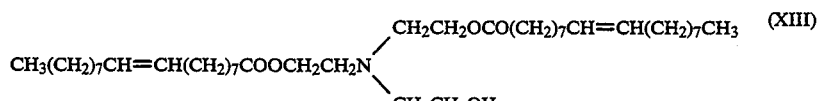

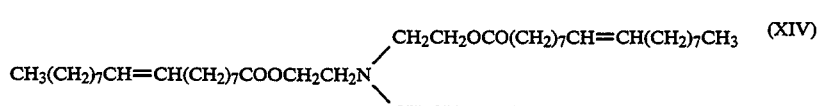

With modified tall oil fatty acids, such as the reaction product of acrylic acid, methacrylic acid, fumaric acid or maleic acid or anhydride with tall oil fatty acids (I, II, III), a variety of polyesters can be formed as the example with C$_{22}$-tricarboxylic acid shows:

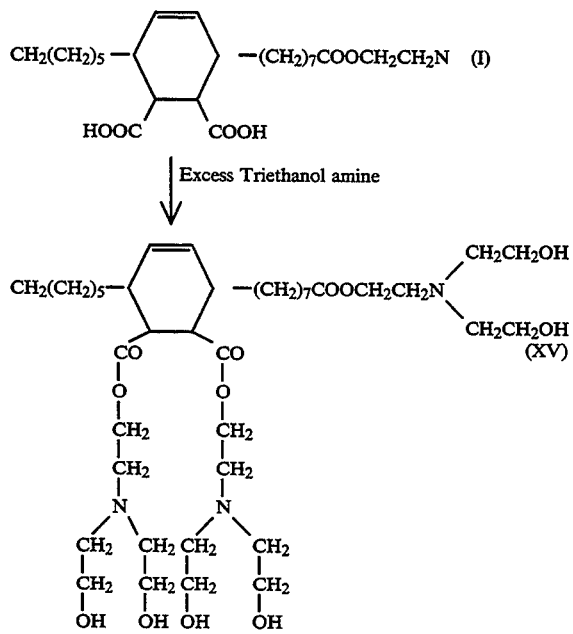

The use of excess triethanol amine will result in the hexahydroxy triamino ester (XV) from which a variety of higher molecular weight polyhydroxy amino esters will be formed when the ratio of $C_{22}$-tricarboxylic acid to monoethanol amine is increased. The condensation (esterifications) is generally carried out at 160°–240° C.

The practice of this invention may be seen in the following examples wherein the preparation of emulsions with various types of emulsifier formulations is illustrated.

EXAMPLE 1

General preparations of the asphalt additives

A. Triethanol amine esters

To 100–280 grams of a blend of tall oil fatty acid and modified tall oil fatty acid containing 10–50% of $C_{21}$-dicarboxylic acid, $C_{22}$-tricarboxylic acid, or $C_{22}$-tricarboxylic acid anhydride, 50–150 grams of triethanol amine were added and heated to 250° C. until all the distillate was collected.

B. Diethanol amine condensates

To 280 grams of tall oil fatty acid, 35–105 grams of diethanol amine were added and heated to 250° C. until all the distillate was collected.

The reaction products of fatty acids with ethanol amines are well documented in the literature; however, the reaction products with the above $C_{21}$- and $C_{22}$- polycarboxylic acids are believed to be novel.

EXAMPLE 2

Table I shows how the addition of tall oil fatty acid-triethanol amine triester to the asphalt affects the demulsibility of asphalt-emulsion and float time of the emulsion residue.

Increasing amounts of asphalt additive improved the high float times of the residue to the required 1200+ seconds. Increasing amounts of $C_{22}$-tricarboxylic acid in the emulsifier formulation at constant asphalt-additive levels decreased the demulsibility to the required minimum level of 60% for rapid set. For medium set high float emulsions, reaction products of a fatty acid and a member of the group consisting of acrylic acid, fumaric acid, methacrylic acid, maleic acid and maleic anhydride are not required. In the case of medium set high float emulsions, the asphalt emulsifier may be the fatty acid, said reaction product, or a mixture thereof.

TABLE I

Properties of Asphalt Emulsions Prepared with Asphalt Containing No Additive and Asphalt Containing Additive
Asphalt Source: Canadian Crude

| Emulsifier | % Dosage | pH Value | % Asphalt Additive[a] | % Demulsibility | Float Time (sec.) |
|---|---|---|---|---|---|
| M28B[b] | 0.4 | 12.5 | — | 23.6 | 510 |
| | 0.5 | 12.5 | — | 19.8 | 537 |
| OCD-128[c]/TKO[d] | 0.4 | 12.5 | — | 26.1 | 1200+ |
| (70:30, W/W) | 0.5 | 12.5 | — | 21.3 | 1200+ |
| OCD-128[c]/TKO[d] | 0.4 | 12.5 | — | 39.6 | 1127 |
| (60:40, W/W) | 0.5 | 12.0 | — | 24.2 | 1200+ |
| TKO[d] | 0.4 | 12.5 | — | 61.3 | 493 |
| | 0.5 | 12.5 | — | 49.5 | 956 |
| M28B[b] | 0.5 | 12.5 | 0.2 | 14.4 | 528 |
| | 0.5 | 12.5 | 0.3 | 12.3 | 1200+ |
| L-5[e] | 0.4 | 12.5 | 0.3 | 19.4 | 1200+ |
| OCD-128[c] | 0.4 | 12.5 | 0.3 | 17.6 | 1200+ |
| OCD-128[c]/TKO[d] | 0.4 | 12.5 | 0.2 | 70.0 | 1200+ |
| (50:50, W/W) | 0.4 | 12.5 | 0.3 | 29.6 | 1200+ |
| TKO[d] | 0.4 | 12.5 | 0.2 | 94.9 | 1200+ |
| | 0.4 | 12.5 | 0.3 | 99.8 | 1200+ |
| | 0.4 | 12.5 | 0.4 | 99.3 | 1200+ |
| | 0.4 | 12.5 | 0.5 | 100.0 | 1200+ |
| | 0.4 | 12.0 | 0.1 | 69.0 | 1200+ |
| | 0.5 | 12.5 | 0.1 | 71.1 | 1200+ |

[a]Tall oil fatty acid L-5/triethanol amine triester.
[b]M28B: mainly consisting of linoleic aid, oleic acid and rosin (approximately 30%).
[c]OCD-128: dimer acid heads consisting of 20% almitic acid, 15% stearic acid, 22% oleic acid, 10% palmitoleic acid, 16% isostearic acid, 7% linoleic acid and other minor components.
[d]TKO: tall oil fatty acid blend consisting of 40% $C_{22}$-tricarboxylic acid and 60% mono fatty acids
[e]L-5: mainly consisting of linoleic acid and oleic acid.

EXAMPLE 3

Table II shows the performance of various additives based on tall oil fatty acids and modified fatty acids and triethanol amine or diethanol amine. As the emulsifier, a combination of 40% $C_{22}$-tricarboxylic acid and 60% mono fatty acid was used.

This example shows that a variety of amino esters as well as amido esters can be added to the asphalt to obtain emulsions with high demulsibility and long float times of the emulsion residue. In particular, the performance of the invention additives is superior to methyl oleate disclosed in the prior art.

TABLE II

Performance of Tall Oil Fatty Acid Condensates with
Di- and Triethanol Amine in High Float Asphalt Emulsions
Asphalt Source: Canadian Crude
Emulsifier: TKO (40% $C_{22}$-tricarboxylic acid
60% tall oil mono-fatty acid)

| % Emulsifier | pH Value | Asphalt Additive | % Additive | % Demulsibility | Float Time (sec.) |
|---|---|---|---|---|---|
| 0.5 | 12.5 | L-5[a]/TEA[b] | 0.3 | 58.4 | 1200+ |
| 0.5 | 12.5 | (280:50, W/W) | 0.4 | 58.9 | 1200+ |
| 0.4 | 12.5 | L-5[a]/TEA[b] | 0.4 | 62.8 | 1200+ |
| 0.4 | 12.0 | (280:100, W/W) | 0.4 | 98.8 | 1200+ |
| 0.4 | 12.0 | L-5[a]/TEA[b] | 0.1 | 69.0 | 1200+ |
| 0.4 | 12.0 | (280:150, W/W) | 0.3 | 62.3 | 1200+ |
| 0.4 | 12.5 | | 0.2 | 94.9 | 1200+ |
| 0.4 | 12.5 | | 0.3 | 99.8 | 1200+ |
| 0.4 | 12.5 | | 0.4 | 99.3 | 1200+ |
| 0.4 | 12.5 | | 0.5 | 100.0 | 1200+ |
| 0.5 | 12.5 | | 0.1 | 71.1 | 1200+ |
| 0.4 | 12.2 | Oleic Acid/TEA[b] (280:125, W/W) | 0.4 | 62.1 | 1200+ |
| 0.4 | 12.2 | M28B[c]/TEA[b] | 0.3 | 49.5 | 1200+ |

TABLE II-continued

Performance of Tall Oil Fatty Acid Condensates with
Di- and Triethanol Amine in High Float Asphalt Emulsions
Asphalt Source: Canadian Crude
Emulsifier: TKO (40% $C_{22}$-tricarboxylic acid
60% tall oil mono-fatty acid)

| % Emul- sifier | pH Value | Asphalt Additive | % Additive | % Demul- sibility | Float Time (sec.) |
|---|---|---|---|---|---|
| 0.4 | 12.0 | OCD-128[d]/TEA[b] (280:125, W/W) | 0.2 | 55.1 | 1200+ |
| 0.4 | 12.0 | TKO[e]/TEA[b] (280:125, W/W) | 0.2 | 50.6 | 1200+ |
| 0.4 | 12.0 | L-5[e]/DEA[f] (1:1, W/W) | 0.2 | 45.6 | 1200+ |
| 0.4 | 12.0 | Methyl Oleate (280:40) | 0.3 | 46.1 | 903 |

[a]L-5: mainly consisting of linoleic acid and oleic acid.
[b]TEA: triethanol amine.
[c]M28B: mainly consisting of linoleic acid, oleic acid and rosin (approximately 30%).
[d]OCD-128: consisting of 20% palmitic acid, 15% stearic acid, 22% oleic acid, 10% palmitoleic acid, 16% isostearic acid, 7% linoleic acid and other minor components.
[e]TKO: tall oil fatty acid blend consisting of 40% $C_{22}$-tricarboxylic acid and 60% mono fatty acids.
[f]DEA: diethanol amine.

EXAMPLE 4

This example shows the performance of L-5/triethanol amine triester with California Basin asphalt.

Table III shows the influence of pH value and concentration of emulsifier and additive on the properties of the asphalt emulsion.

TABLE III

Properties of Asphalt Emulsions
Asphalt Source: California Basin Crude
Emulsifier: TKO (40% $C_{22}$-tricarboxylic acid, 60% mono unsaturated fatty acid)
Asphalt Additive: L-5/TEA (280:150, W/W)

| % Emulsifier | pH Value | % Asphalt Additive | % Demul- sibility | Float Time (sec.) |
|---|---|---|---|---|
| 0.4 | 12.5 | 0.1 | 28.4 | 707 |
| 0.4 | 12.5 | 0.2 | 35.8 | 790 |
| 0.4 | 12.5 | 0.3 | 23.9 | 764 |
| 0.4 | 12.5 | 0.4 | 17.8 | 1200+ |
| 0.4 | 12.5 | 0.5 | 18.0 | 1200+ |
| 0.4 | 12.5 | 0.6 | 22.7 | 1200+ |
| 0.3 | 12.5 | 0.4 | 20.1 | 1200+ |
| 0.3 | 12.5 | 0.5 | 16.5 | 1200+ |
| 0.3 | 12.5 | 0.6 | 12.5 | 1200+ |
| 0.4 | 12.0 | 0.5 | 98.9 | 1200+ |
| 0.4 | 12.1 | 0.5 | 79.9 | 1200+ |
| 0.4 | 12.2 | 0.5 | 68.1 | 1200+ |
| 0.4 | 12.3 | 0.5 | 40.7 | 1200+ |
| 0.4 | 12.5 | 0.5 | 18.0 | 1200+ |

Increasing amounts of additive decrease the demulsibility and increase the float time when the emulsion pH value is kept constant. Increasing pH value decreases the demulsibility when the concentration of emulsifier and asphalt additive is kept constant.

While this invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

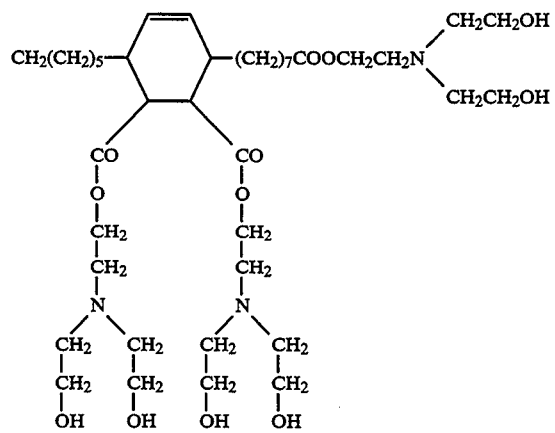

What is claimed is:

1. A method of forming a high float rapid set aqueous bituminous emulsion comprising bitumen and water portions; wherein from about 0.3% to about 0.5%, based on the weight of the emulsion, of an anionic emulsifier in the form of an acid salt, comprised of a mixture of a first fatty acid and the reaction product of the first fatty acid with a member of the group consisting of acrylic acid, methacrylic acid, fumaric acid, maleic acid, and maleic anhydride is added to the water portion; and wherein from 0.1% to about 0.7%, based on the weight of the asphalt, of an asphalt additive comprised of a condensation reaction product of a second fatty acid reacted with an amino alcohol selected from a member of the group consisting of

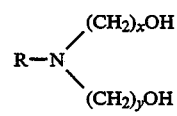

where $R=CH_3-$, $C_2H_5-$ through $C_{18}H_{30-36}-$, $HO(CH_2)_z-$ and where x, y, z=2-6 and

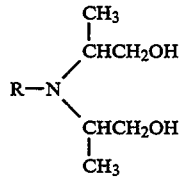

where $R=CH_3-$, $C_2H_5-$ through $C_{18}H_{30-36}-$,

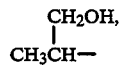

and $HO(CH_2)_z$, where z=2-6, is added to the bitumen portion prior to emulsification by combining the bitumen and water proportions; and wherein the bitumen contains a high naphthenic acid or a high wax content and has an acid number of from 3.0 to 5.0.

2. The method of claim 1 wherein the first fatty acid is selected from the group consisting of $C_{10}$-$C_{18}$ unsaturated fatty acid and a blend of the $C_{10}$-$C_{18}$ unsaturated fatty acid with rosin derived resin acid and the second fatty acid is selected from the group consisting of tall oil fatty acid, modified tall oil fatty acid wherein the modified tall oil fatty acid is the product of the reaction of a tall oil fatty acid with a member of the group consisting of acrylic acid, methacrylic acid, fumaric acid, maleic acid, and maleic anhydride, and combinations thereof.

3. The method of claim 2 wherein the $C_{10}$-$C_{18}$ unsaturated fatty acid is derived from a member of the group consisting of crude tall oil, distilled tall oil, and tallow.

4. The method of claim 1 wherein the amino alcohol is selected from the group consisting of monoethanol amine, diethanol amine, and triethanol amine.

5. The method of claim 1 wherein the anionic emulsifier is a mixture of members selected from the group consisting of $C_{18}$-monocarboxylic acid, $C_{21}$-dicarboxylic acid, $C_{22}$-tricarboxylic acid, $C_{22}$-tricarboxylic anhydride, $C_{20}$-polycyclic monocarboxylic acid, $C_{24}$-polycyclic tricarboxylic acid, and $C_{24}$-polycyclic polytricarboxylic anhydride.

6. The method of claim 1 wherein the anionic emulsifier is selected from the group consisting of

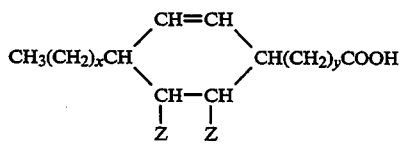
wherein x and y are integers from 3 to 9 and x and y together equal 12, at least one Z is a carboxylic acid group and any remaining Z is hydrogen,
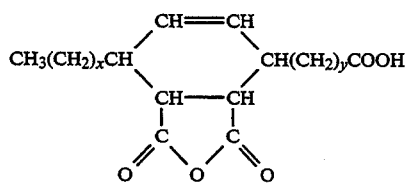
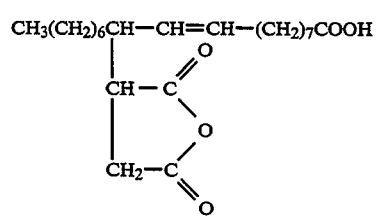
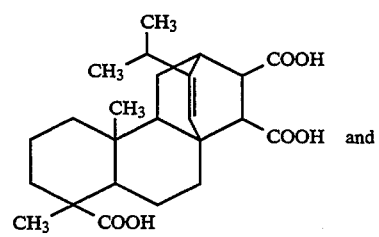
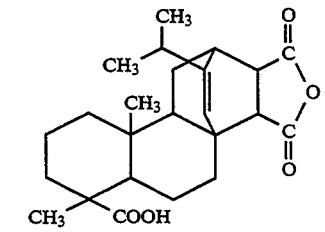
7. The method of claim 1 wherein the asphalt additive is selected from the group consisting of
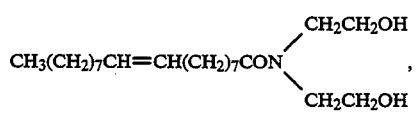
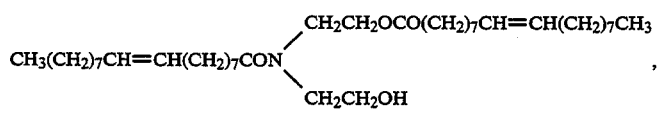
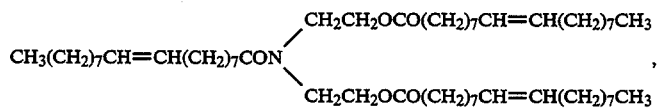
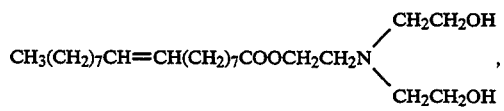
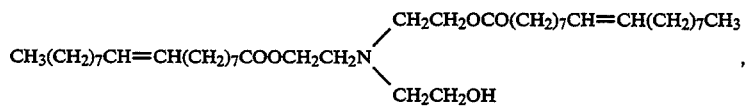
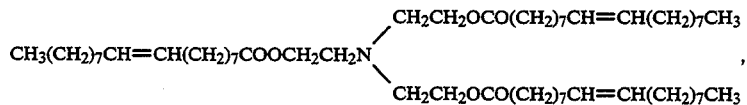
and